United States Patent
Yang et al.

(10) Patent No.: US 10,003,218 B2
(45) Date of Patent: Jun. 19, 2018

(54) CHASSIS DESIGN FOR WIRELESS-CHARGING COIL INTEGRATION FOR COMPUTING SYSTEMS

(71) Applicant: Intel Corporation, Santa Clara, CA (US)

(72) Inventors: Songnan Yang, San Jose, CA (US); Janardhan Narayan, Fremont, CA (US); Jonathan Rosenfeld, Portland, OR (US); Kerry Stevens, Beaverton, OR (US); Patrick Chewning, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/578,422

(22) Filed: Dec. 20, 2014

(65) Prior Publication Data

US 2016/0204656 A1  Jul. 14, 2016

(51) Int. Cl.
*H02J 50/10* (2016.01)
*H02J 7/02* (2016.01)
(Continued)

(52) U.S. Cl.
CPC ............ *H02J 50/10* (2016.02); *G06F 1/1613* (2013.01); *G06F 1/1656* (2013.01); *H01F 27/02* (2013.01);
(Continued)

(58) Field of Classification Search
CPC ......... H02J 50/10; H02J 7/025; G06F 1/1613; G06F 1/1656
See application file for complete search history.

(56) References Cited

U.S. PATENT DOCUMENTS 6,498,731 B1  12/2002  Roscoe
6,798,326 B2 *  9/2004  Iida ..................... H01F 17/0006
                                                257/E21.022
(Continued)

FOREIGN PATENT DOCUMENTS

WO    2013165421 A1    11/2013

OTHER PUBLICATIONS

International Search Report and Written Opinion dated Mar. 4, 2016, issued in related International Application No. PCT/US2015/66961, 10 pages.
(Continued)

*Primary Examiner* — David M Sinclair
*Assistant Examiner* — Robert Brown
(74) *Attorney, Agent, or Firm* — Schwabe, Williamson & Wyatt, P.C.

(57) ABSTRACT

This disclosure pertains to wireless power transfer systems, and in particular (but not exclusively), to techniques to improve the coupling efficiency between a power transmitting unit and a power receiving unit within a computing device. The present disclosure includes a system which comprises a computing unit which includes a power receiving unit and a conductive surface. The conductive surface has an opening that is adjacent to the power receiving unit and a slot extending from the opening towards the perimeter of the conductive surface. The computing unit further includes a system base coupled to the power receiving unit wherein the power receiving unit is to provide power to the system base. The system also includes a power transmitting unit adjacent to the computing unit.

20 Claims, 7 Drawing Sheets

(51) Int. Cl.
- *G06F 1/16* (2006.01)
- *H01F 27/02* (2006.01)
- *H01F 27/36* (2006.01)
- *H01F 38/14* (2006.01)
- *H02J 7/00* (2006.01)

(52) U.S. Cl.
CPC ........... *H01F 27/362* (2013.01); *H01F 38/14* (2013.01); *H02J 7/025* (2013.01); *H02J 7/0042* (2013.01)

(56) References Cited

U.S. PATENT DOCUMENTS

| | | | | |
|---|---|---|---|---|
| 7,352,567 | B2* | 4/2008 | Hotelling | G06F 1/1632 312/223.2 |
| 7,622,891 | B2* | 11/2009 | Cheng | H02J 5/005 320/108 |
| 7,633,263 | B2* | 12/2009 | Toya | H02J 7/025 320/103 |
| 7,906,936 | B2* | 3/2011 | Azancot | G06F 1/26 320/108 |
| 8,223,082 | B2 | 7/2012 | Chiang et al. | |
| 8,432,049 | B2* | 4/2013 | Jung | F03B 13/262 290/1 R |
| 8,616,921 | B2* | 12/2013 | Byrne | H01R 25/00 439/214 |
| 8,922,066 | B2* | 12/2014 | Kesler | B60L 11/1812 307/104 |
| 8,951,054 | B2* | 2/2015 | Byrne | H01R 13/447 307/104 |
| 9,124,308 | B2* | 9/2015 | Metcalf | A47C 7/70 |
| 9,424,983 | B2* | 8/2016 | Choi | H01F 27/2804 |
| 2005/0016746 | A1* | 1/2005 | Sze | H05K 1/0227 174/396 |
| 2005/0189910 | A1* | 9/2005 | Hui | H01F 17/0006 320/108 |
| 2006/0076922 | A1* | 4/2006 | Cheng | H01F 38/14 320/108 |
| 2007/0182658 | A1* | 8/2007 | Ozden | H01Q 1/243 343/866 |
| 2008/0061733 | A1* | 3/2008 | Toya | H02J 7/025 320/103 |
| 2008/0116847 | A1* | 5/2008 | Loke | H02J 7/025 320/108 |
| 2008/0211458 | A1* | 9/2008 | Lawther | H02J 7/025 320/132 |
| 2008/0278112 | A1* | 11/2008 | Hui | H01F 38/14 320/108 |
| 2009/0033280 | A1* | 2/2009 | Choi | H02J 7/025 320/108 |
| 2009/0096413 | A1* | 4/2009 | Partovi | H01F 5/003 320/108 |
| 2009/0207150 | A1* | 8/2009 | Obi | G06F 3/046 345/174 |
| 2009/0212637 | A1* | 8/2009 | Baarman | H01F 7/0247 307/104 |
| 2009/0212639 | A1* | 8/2009 | Johnson | H02J 5/005 307/104 |
| 2009/0278494 | A1* | 11/2009 | Randall | H02J 7/0044 320/114 |
| 2010/0156345 | A1* | 6/2010 | Phelps, III | H02J 7/025 320/108 |
| 2010/0225272 | A1* | 9/2010 | Kirby | H04B 5/00 320/108 |
| 2010/0290215 | A1* | 11/2010 | Metcalf | A47B 21/00 362/127 |
| 2011/0006611 | A1* | 1/2011 | Baarman | H01F 38/14 307/104 |
| 2011/0031320 | A1* | 2/2011 | Kato | G06K 19/07749 235/492 |
| 2011/0036747 | A1* | 2/2011 | Petrick | G06F 1/1628 206/701 |
| 2011/0063184 | A1* | 3/2011 | Furumura | G06K 19/07749 343/856 |
| 2011/0115433 | A1* | 5/2011 | Lee | H02J 7/025 320/108 |
| 2011/0216485 | A1* | 9/2011 | Kang | H04M 1/0254 361/679.01 |
| 2012/0044116 | A1* | 2/2012 | Chiang | H01Q 1/2266 343/767 |
| 2012/0069506 | A1* | 3/2012 | Lai | H02J 7/025 361/679.01 |
| 2012/0086394 | A1* | 4/2012 | Hui | H01F 38/14 320/108 |
| 2012/0176282 | A1 | 7/2012 | Kato et al. | |
| 2012/0235636 | A1 | 9/2012 | Partovi et al. | |
| 2012/0262357 | A1* | 10/2012 | Kato | H01Q 1/38 343/788 |
| 2013/0119926 | A1* | 5/2013 | Lin | H02J 7/025 320/108 |
| 2013/0147720 | A1* | 6/2013 | Yilmaz | G06F 1/1635 345/173 |
| 2013/0154559 | A1* | 6/2013 | Cho | H02J 7/025 320/108 |
| 2014/0092543 | A1* | 4/2014 | Yang | G06F 1/1698 361/679.08 |
| 2014/0111148 | A1* | 4/2014 | Chen | H04B 5/0037 320/108 |
| 2014/0111153 | A1* | 4/2014 | Kwon | H02J 7/025 320/108 |
| 2014/0252871 | A1* | 9/2014 | Azancot | H01F 38/14 307/104 |
| 2014/0273590 | A1* | 9/2014 | Sharma | G06F 1/1669 439/350 |
| 2014/0285967 | A1 | 9/2014 | Wikander | |
| 2014/0340030 | A1* | 11/2014 | Jung | H02J 7/025 320/108 |
| 2015/0049252 | A1* | 2/2015 | Matsuhisa | H02J 17/00 348/730 |
| 2015/0270737 | A1* | 9/2015 | Shirakawa | H02J 7/025 320/108 |
| 2015/0287519 | A1* | 10/2015 | Bodenstedt | H01F 41/04 336/222 |
| 2015/0303561 | A1 | 10/2015 | Yang et al. | |
| 2015/0364946 | A1* | 12/2015 | Wang | H02J 7/04 455/573 |
| 2016/0181857 | A1* | 6/2016 | Konanur | H01Q 7/00 320/108 |

OTHER PUBLICATIONS

Non-Final Office Action dated Oct. 7, 2016, issued in related U.S. Appl. No. 14/672,169.

Final Office Action dated Jul. 13, 2017, issued in related U.S. Appl. No. 14/672,169.

Non-Final Office Action dated Nov. 16, 2017, issued in related U.S. Appl. No. 14/672,169, 24 pages.

* cited by examiner

CHASSIS DESIGN FOR WIRELESS-CHARGING COIL INTEGRATION FOR COMPUTING SYSTEMS

FIELD

This disclosure pertains to wireless power transfer systems, and in particular (but not exclusively), to techniques to improve the coupling efficiency between a power transmitting unit and a power receiving unit within a computing device.

BRIEF DESCRIPTION OF THE DRAWINGS

To facilitate understanding, identical reference numerals have been used, where possible, to designate identical elements that are common to the drawings. The present disclosure may readily be understood by considering the following detailed description with the accompanying drawings which are not necessarily drawn to scale, in which.

DETAILED DESCRIPTION

A detailed description of some embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to some embodiments have not been described in detail to avoid unnecessarily obscuring the description.

This disclosure pertains to wireless power transfer systems, and in particular (but not exclusively), to techniques to improve the coupling efficiency between a power transmitting unit and a power receiving unit within a computing device. The present disclosure includes a system which comprises a computing unit which includes a power receiving unit and a conductive surface. The conductive surface has an opening that is adjacent to the power receiving unit and a slot extending from the opening towards the perimeter of the conductive surface. The computing unit further includes a system base coupled to the power receiving unit wherein the power receiving unit is to provide power to the system base. The system also includes a power transmitting unit adjacent to the computing unit.

Figure 1:
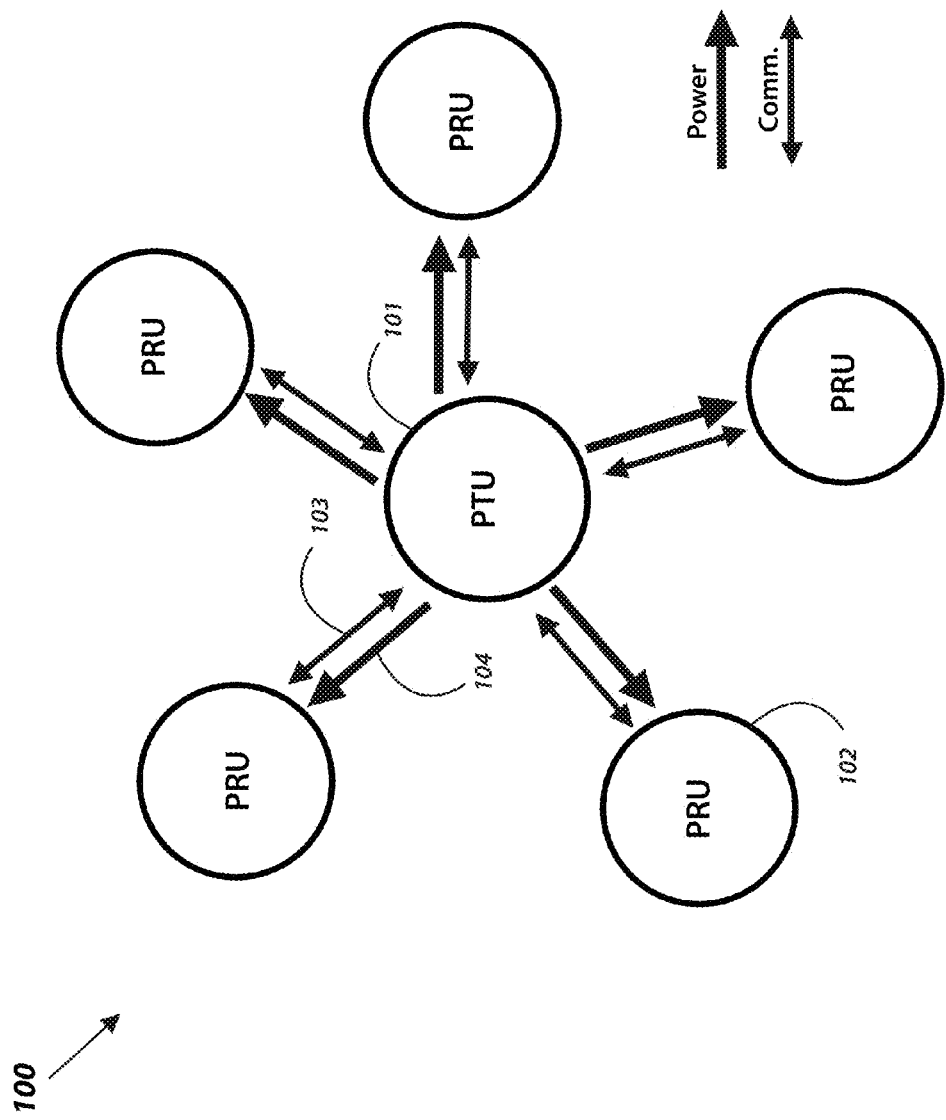
FIG. 1 is an exemplary architecture of a wireless power transfer system.

FIG. 1 is an exemplary architecture of a wireless power transfer system 100. As shown, the wireless power transfer system 100 includes a star topology with a power transfer unit (PTU) 101 and one or more power receiving units (PRU) 102. In some embodiments, PTU 101 exchanges information (e.g., communication 103) with one or more PRUs 102. Likewise, each PRU 102 transmits its information to PTU 101 and also receives network management information from PTU 101. Most notably, PTU 101 transfers power 103 to the PRUs 102.

In some implementations, PTU 101 transfers power to PRUs 102 in an uniform manner to effect position flexibility and standardize electrical requirements among the PRU 102 devices. Power uniformity may be defined as varying between a minimum and maximum magnetic field in the range from 1:1.2 to 1:1.3.

The wireless power transfer process may begin with configuring PTU 101 in a Power Save State and applying short and long beacons to a PTU resonator as required for load variation detection and to elicit a PRU response. Upon device detection, PTU 101 may transition to a Low Power State, establish a communication link with PRU 102, and exchange information necessary for wireless power transfer. When PTU 101 is in a Power Transfer State, PTU 101 may configure the timing and sequence of the PRUs 102.

In some embodiments, once the PTU and PRU devices have exchanged static information, PTU 101 reads a PRU dynamic parameter that provides measured parameters from the PRUs 102. PTU 101 then writes a value to the PRU Control, including the enable/disable charge and permission. PTU 101 may write to the PRU Control as needed and PTU 101 periodically reads the PRU Dynamic Parameter that contains values such as, but not limited to, voltage, current PRU status, and temperature.

Figure 2:
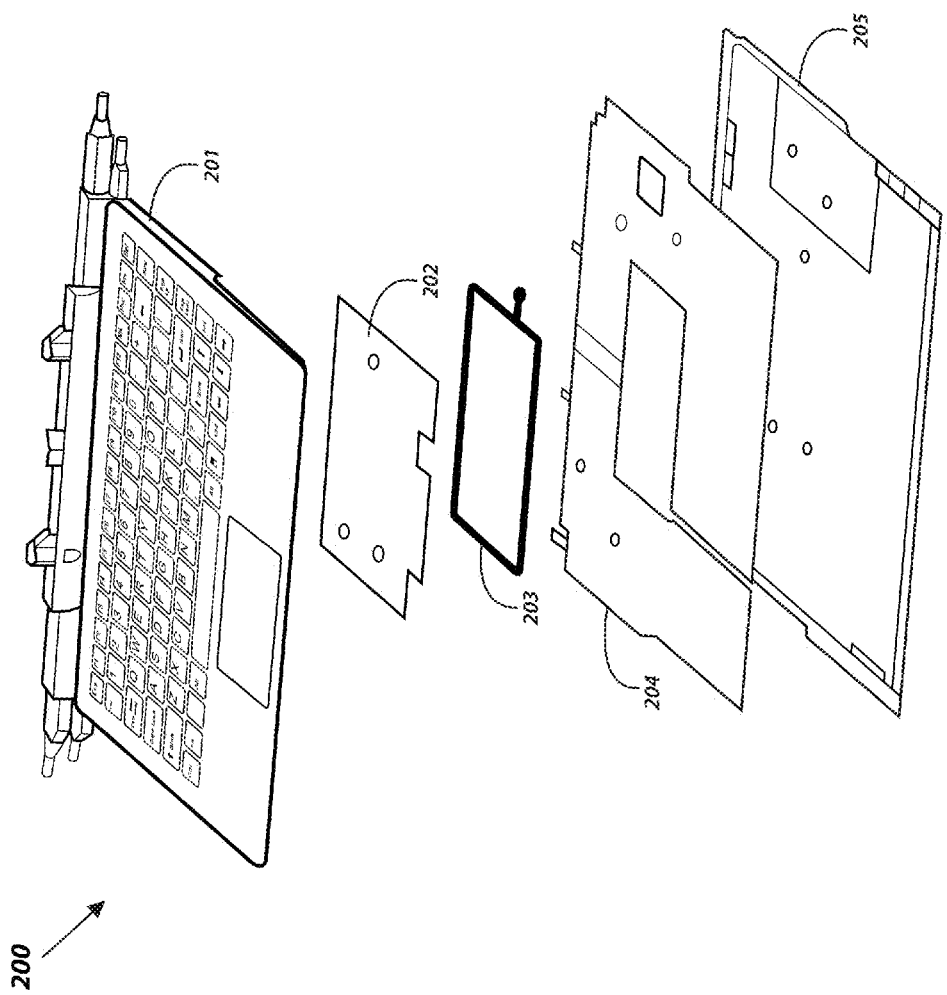
FIG. 2 is an exploded view of a computing system consistent with the present disclosure.

FIG. 2 is an exploded view of a computing system 200 (i.e., ultrabook) consistent with the present disclosure. Computing system 200 includes a novel conductive surface and PRU assembly therein. As shown, computing system 200 includes a system base 201, electromagnetic shield 202, PRU 203, conductive surface 204, and back cover 205. Computing system 200 may include more components than those shown so long as they do not deviate from the present disclosure of improved magnetic coupling between the PRU and PTU devices.

The components of computing system 200 may be assembled in the order shown such that electromagnetic shield 202 is adjacent to system 201 to deter electromagnetic interference and electrostatic charges from contacting component circuitry in the system base 201. Likewise, PRU 203 is adjacent to conductive surface 204 to effect magnetic coupling with an external PTU device and further shield unwanted electrical charges from affecting circuitry with system base 201. In addition, conductive surface 204 is adjacent to back cover 205 to maximize magnetic coupling with an external PTU device without risk of damage to the conductive surface 204 from ambient conditions (e.g., external surfaces, weather, etc).

System base 201 may include a keyboard, touchpad, Ethernet port, display port, microphone-in jack, or speaker line-out jack. In FIG. 2, system base 201 includes a keyboard and touchpad. Electromagnetic shield 202 may comprise any material which effectively prevents electromagnetic interference and electrostatic charges from reaching system base 201. In some embodiments, electromagnetic shield 202 comprises ferrite. PRU 203 may consist of magnetic coils, with multiple turns, which magnetically couple with an external PTU device during a power transfer. Conductive surface 204 may have a body which extends towards the perimeter of back cover 205. Back cover 205 may be non-conductive (e.g., non-conductive back cover 205).

Figure 3:
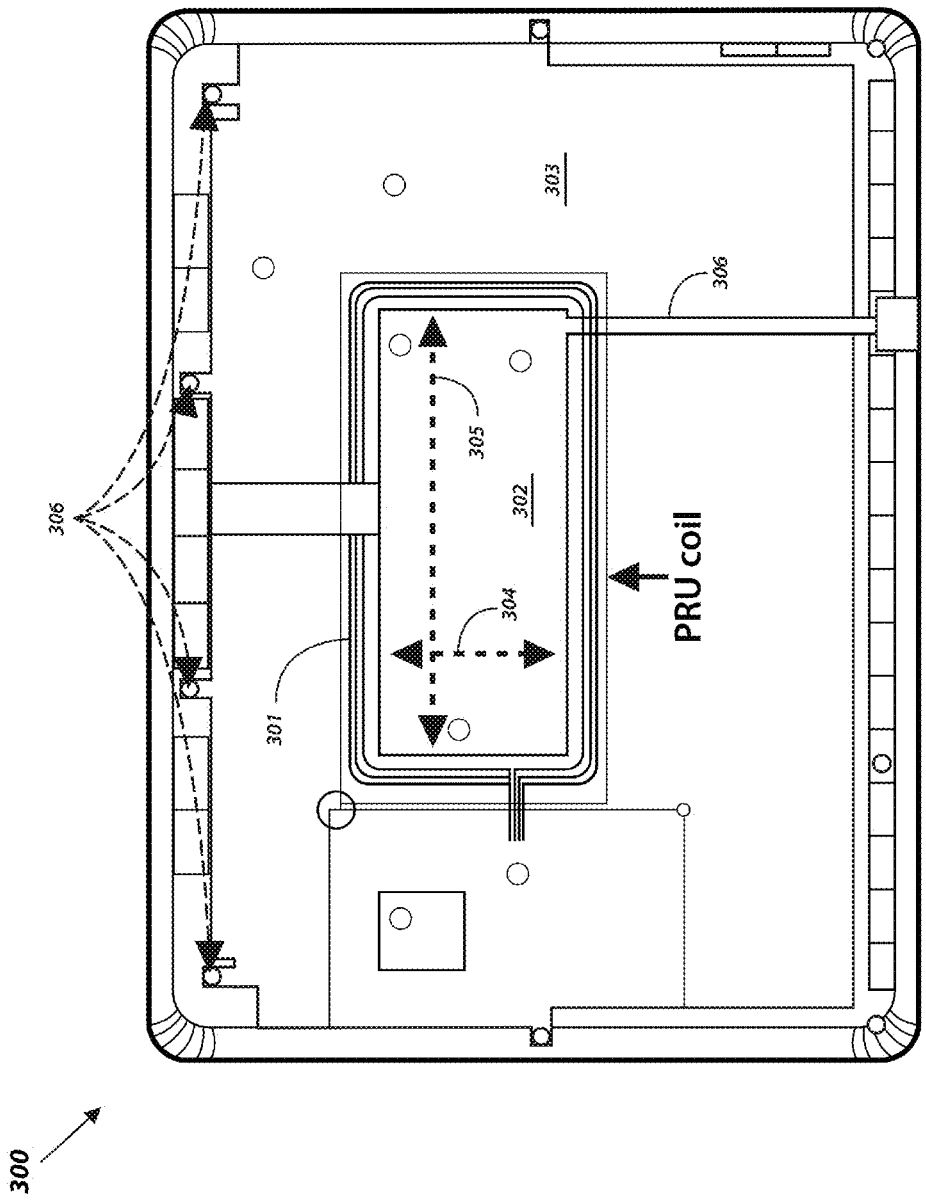
FIG. 3 is a top view of a PRU coil and conductive sheet disposed on a back cover of a computing device.

FIG. 3 is a top view of a PRU 301 and a conductive surface 303 disposed on a back cover 300 of a computing device. In the embodiments shown, PRU 301 includes a magnetic coil whereas conductive surface 303 includes a conductive sheet. In some embodiments, conductive surface 303 is highly conductive and is more conductive than the device components within the system base. Conductive surface 300 may include copper (e.g., copper tape) or aluminum. The thickness of conductive surface may be on the order of hundreds of microns.

Notably, conductive surface 303 includes an opening 302 (e.g. window) in a center portion therein. It should be understood, however, that the opening 302 does not necessarily have to be in a center portion of the conductive surface 303.

Opening 302 may have a symmetric shape such as a rectangular ring shape but is not limited thereto. For example, opening 302 may have a circular or square shape. Most notably, opening 302 allows a magnetic field to penetrate through the conductive surface 303. As such, the size of opening 302 affects the magnetic coupling between PRU 301 and the PTU device. The size of opening 302 should be smaller than the most internal turn of the PRU coil 301. In some embodiments, the size of opening 302 may be adjustable to meet the magnetic coupling requirements between PRU 301 and the PTU device.

In embodiments when opening 302 has a rectangular shape, the dimensions (304, 305) of opening 302 may be approximately 35 mm×56 mm. In some implementations, the mutual impedance (Z) between PRU 301 and the PTU device is approximately 34 ohms. The dimensions of other suitable sizes of opening 302 may be 16 mm×56 mm and 56 mm×133 mm which may yield 30 ohms and 40 ohms, respectively.

In some embodiments, the shape of PRU 301 matches (or substantially matches) the shape of the perimeter of the opening 302. For example, if the shape of opening 302 is rectangular, the shape of PRU 301 is also rectangular. Regardless of the shape of the opening 302, the area within PRU 301 should exceed that of the opening 302. For example, in one implementation, the dimensions of opening 302 are 35 mm×56 mm in size and the dimensions of PRU 301 is 150 mm×75 mm in size.

In addition to opening 302, conductive surface 303 includes a slot 306 which breaks the ring-shaped conductive surface 303. Advantageously, slot 306 prevents eddy currents to form around the perimeter of opening 302. However, slot 306 should have dimensions which allow the system base and other components of the device to be shielded by the conductive surface 303 without significantly reducing the magnetic coupling between PRU 301 and the PTU device. In some implementations, the area of slot 306 is less than ⅒ the area of conductive surface 303. The width of slot 306 may range from 5-10 mm. For example, the width of slot 306 may be approximately 7 mm.

The conductive surface 300 may be grounded to retain ESD protection and EMI shielding of the chassis. For example, grounding points 306 (e.g., screws) may be disposed at strategic locations away from slot 306. Moreover, the conductive surface 300 may comprise a material that effectively eliminates unwanted coupling, loss, and interference to system components. For example, the dimensions of conductive surface 300 may span the area of a keyboard, touchpad, Ethernet port, display port, microphone-in jack, speaker line-out jack, and battery.

In some implementations, the bottom cover/conductive surface structure can be constructed by modifying a metal chassis by a co-molding technique. For instance, a co-molding technique may modify plastic for the bottom cover and metal for the conductive surface. In some embodiments, when the metal chassis is formed by a co-molding process, the side of the conductive surface 300 with the slot 306 does not have grounding between the metal bottom cover and system ground.

Figure 4:
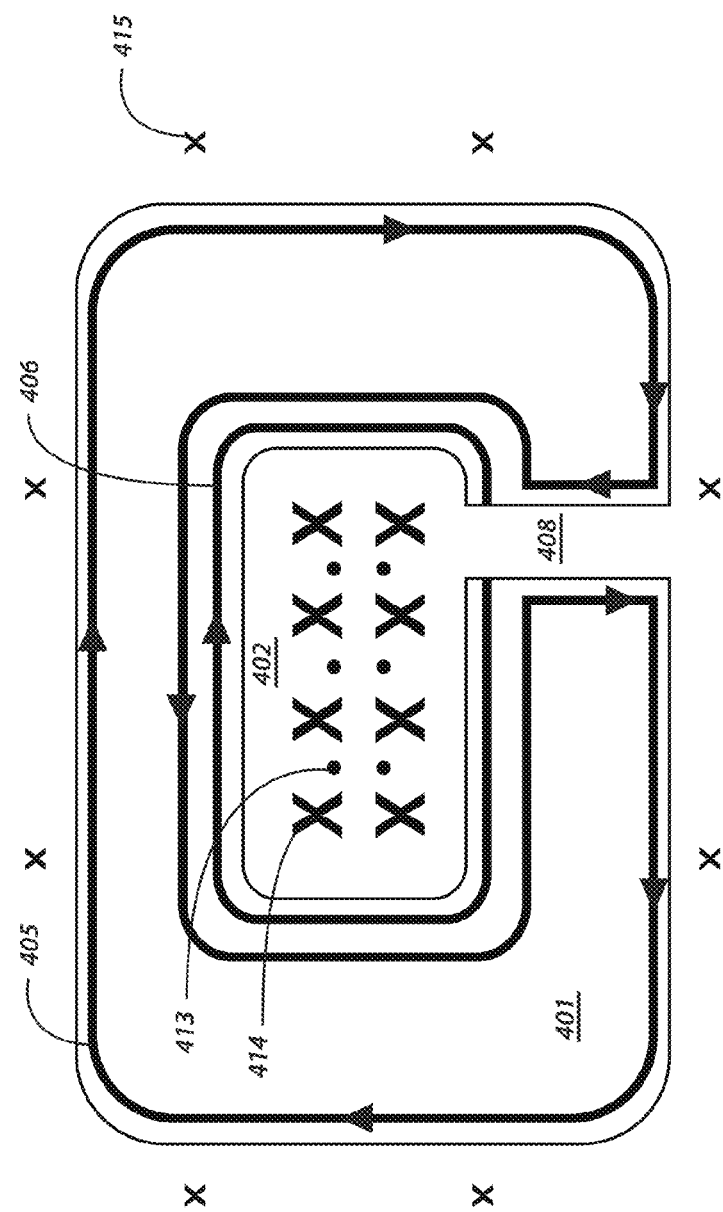
FIG. 4 is an exemplary illustration of eddy currents generated around a conductive surface consistent with the present disclosure.

FIG. 4 is an exemplary illustration of eddy currents generated around a conductive surface 400 consistent with the present disclosure. Advantageously, the present disclosure allows the magnetic field 414, generated by an external PTU device, penetrate through the conductive surface 400 by disrupting the formation of an eddy current 405 loop around the opening 402 by the presence of a slot 408. The eddy current(s) 405 are generated as a result of the PRU coil current 406 generated by the magnetic coupling between the PRU coil (not shown) and the external PTU device. Notably, the resulting eddy current 405 traverses in an opposite direction of the PRU coil current 406. However, both the eddy-current reactive field 413 and the PRU magnetic field 414 penetrates through the opening 402 of the conductive surface 400. The magnitude of the eddy-current reactive field 413 that penetrates opening 402 is significantly reduced due to the presence of slot 408.

In particular, some of the eddy-current reactive field 415 is distributed around the perimeter of the conductive surface 400 as the eddy current 405 traverses the perimeter of the sheet 400 as shown in FIG. 4. Accordingly, the eddy current 405 can not complete its loop but instead is forced to traverse along the outer edge of the conductive surface 400 thereby enhancing the magnetic field 414 generated by the PRU coil behind the conductive surface 400. Although the conductive sheet 400 comprises a single slot 408, the present disclosure anticipates that the conductive sheet 400 may include one or more slots 408 therein.

As described above, the magnitude of the magnetic field that penetrates the opening 402 of conductive surface 400 is a function of the size and area of the opening 402. Likewise, the size and area of the opening 402 controls the amplitude of the resulting eddy current and eventually alters the magnetic coupling between the PRU coil and PTU device. During experimentation of various sizes of opening 402, it was discovered that as the size of opening 402 increases, the resulting mutual impedance (Z) between the PRU coil and PTU device also increases.

Accordingly, the magnetic coupling between the PRU coil and the PTU device is a function of the size of opening 402 within the conductive surface 400. The present disclosure therefore employs a unique conductive surface solution to achieve maximum coupling optimization and flexibility. Moreover, the conductive surface 400 anticipated by the present disclosure also effectively maintains EMI/ESD integrity.

Figure 5:
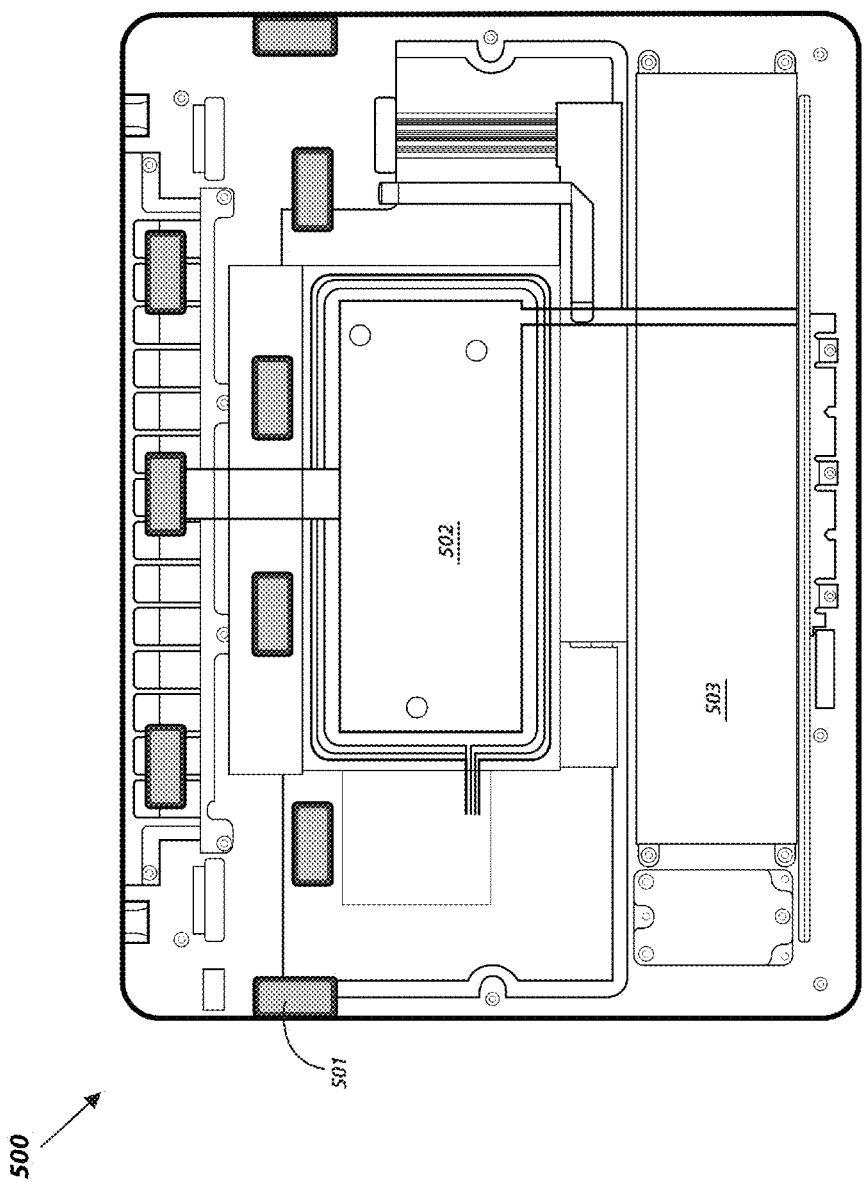
FIG. 5 is an exemplary illustration of the back of a computing device consistent with the present disclosure.

FIG. 5 is an exemplary illustration of a back of a computing device consistent with the present disclosure. As shown, back cover 500 features a non-conductive back cover 503, an electromagnetic shield 502, and a plurality of EMI gaskets 501 of a Faraday cage. The present disclosure is not limited to employing a full Faraday cage as shown in the figure. The present disclosure also anticipates employing a semi-Faraday cage on an external portion of the non-conductive back cover 503.

Figure 6:
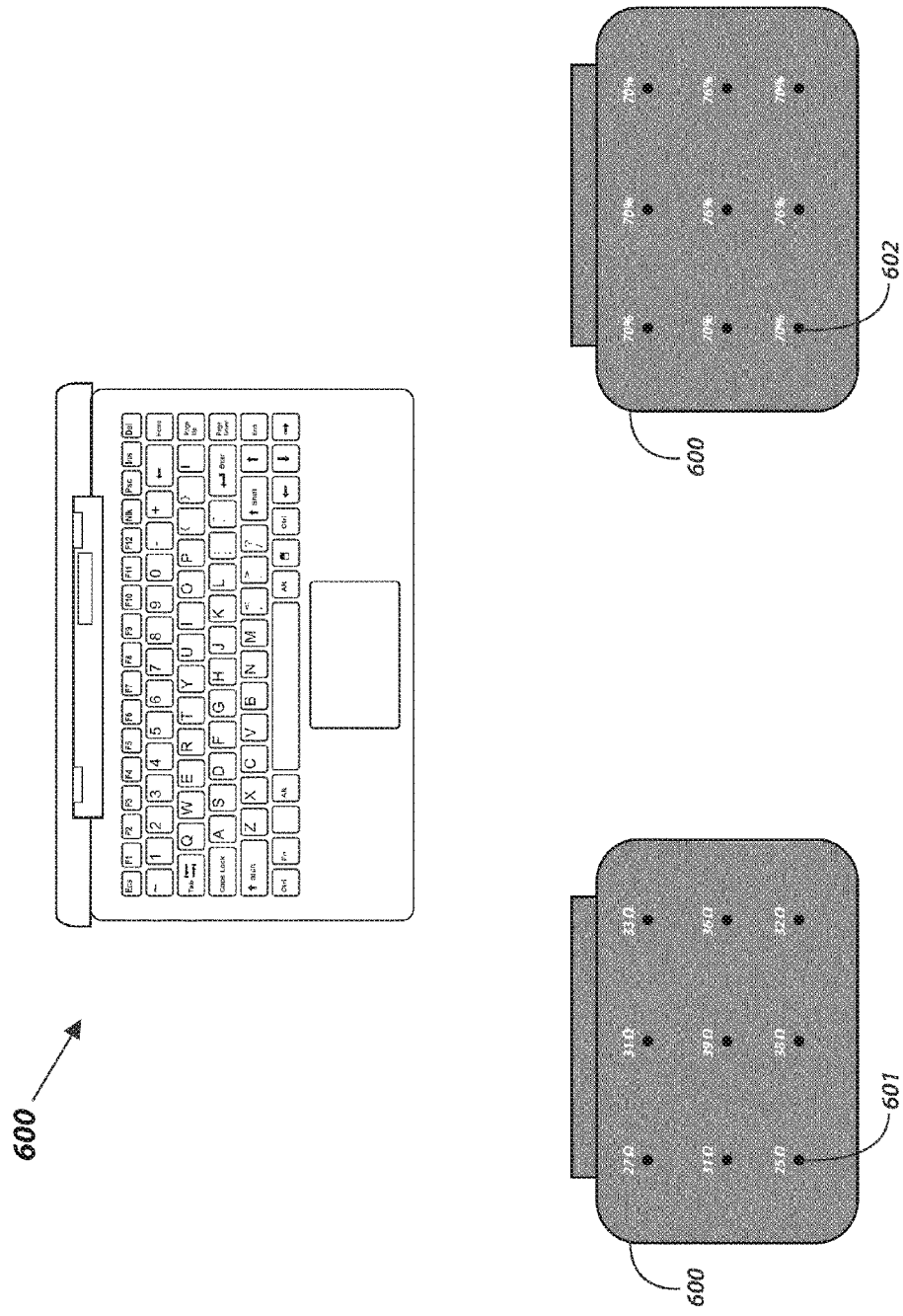
FIG. 6 is a lateral profile of a computing device consistent with the present disclosure and the routing of ESD noise to ground through an internal conductive surface.

FIG. 6 is a lateral profile of a computing device 600 consistent with the present disclosure and the routing of ESD noise to ground through an internal conductive surface. FIG. 6 also illustrates the mutual coupling impedance 601 and coil-to-coil efficiency 602 of a PRU coil with an external PTU device (not shown) at distinct locations within a computing device 600. Advantageously, the disclosed wireless charging integration solution provides a viable method of integrating wireless charging PRU's into mobile platforms without significantly impacting the wireless charging performance and system EMI/ESD integrity. The novel conductive surface employed can increase the coil-to-coil (from PTU and PRU devices) efficiency to close to 80%. In the figure, the mutual coupling impedance 601 and coil-to-coil efficiency 602 were measured at nine distinct locations. As shown, the mutual coupling impedance 601 varies from 25 to 39 ohms and the coil-to-coil efficiency 602 from 70 to 76%.

Figure 7:
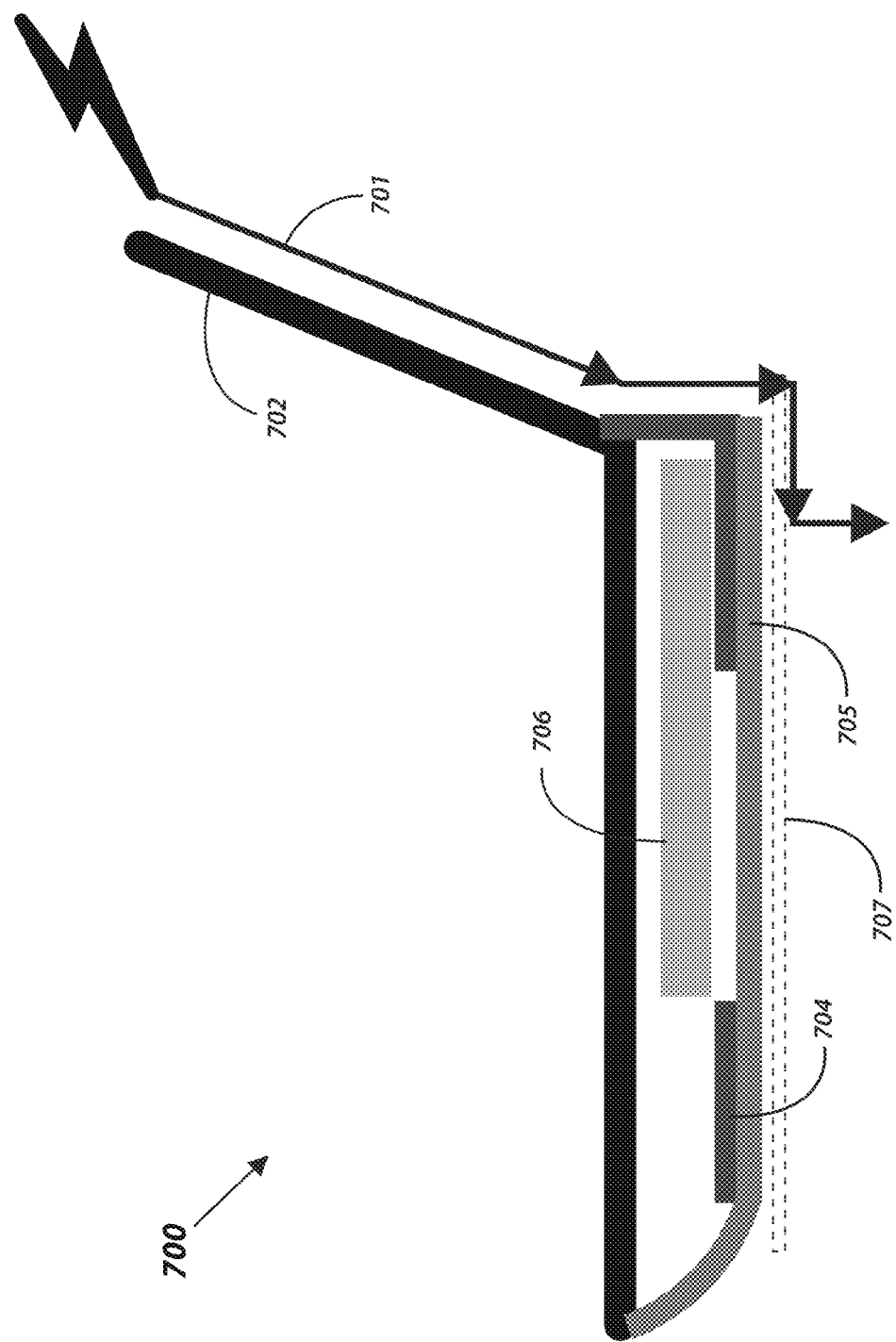
FIG. 7 is an illustration of the routing of ESD noise to ground through a computing device having an internal PRU/conductive surface unit consistent with the present disclosure.

FIG. 7 is an illustration of the routing of ESD noise to ground through a computing device 700 having an internal PRU/conductive surface unit consistent with the present disclosure. As illustrated, ESD noise 701 (which may be generated from a user's handling of the monitor 702) is guided to grounding points beneath the computing device 700 via a conductive path created by a conductive sheet 704, 705 (cross-section of conductive sheet body) disposed on the inside surface of the device's 700 back cover.

Accordingly, the wireless charging solution described herein significantly reduces the degree of ESD from passing through the motherboard 706 and other critical components within the computing device 700. During operation, a PTU 707 can efficiently transfer power to the computing device 700 without exposing system components to significant ESD/EMI effects.

The PRU coil integration technique enables OEMs to integrate wireless charging solutions that meet the wireless charging, EMI/ESD, and mechanical requirements. The wireless charging solution disclosed herein also separates the tuning of coil-to-coil coupling from coil designs, which essentially allows unified modular PTU and PRU modules to be developed and implemented while optimizing the magnetic coupling by adjusting the proposed conductive surface structure.

The preceding description and accompanying drawings describe example embodiments in some detail to aid understanding. However, the scope of the claims may cover equivalents, permutations, and combinations that are not explicitly described herein.

What is claimed is:

1. An apparatus, comprising:
   a computing unit, comprising:
      a power receiving unit;
      a conductive surface having an opening that is adjacent to the power receiving unit and a cavity extending from the opening towards a perimeter of the conductive surface, the conductive surface having a plurality of grounding point screws located away from the cavity to retain electrostatic discharge and electromagnetic interface shielding of a chassis; and
      a system base coupled to the power receiving unit wherein the power receiving unit is to provide power to the system base,
   wherein the conductive surface and the system base are produced by a co-molding process such that a side of the conductive surface nearest to the cavity does not have ground between the system base and system ground.

2. The apparatus of claim 1, wherein the power receiving unit includes a magnetic coil.

3. The apparatus of claim 1, wherein the opening of the conductive surface has at least one of a circular, square, or rectangular shape.

4. The apparatus of claim 1, wherein the computing unit comprises a non-conductive bottom cover which is adjacent to the conductive surface.

5. The apparatus of claim 1, wherein the system base includes at least one input device.

6. The apparatus of claim 1, wherein the apparatus is an ultrabook computer.

7. The apparatus of claim 1, wherein the conductive surface includes a conductive sheet.

8. A computing device, comprising:
   a non-conductive bottom cover;
   a conductive sheet, having an opening, adjacent to the non-conductive bottom cover and
   the conductive sheet having a slot extending from the opening towards a perimeter of the conductive sheet,
   wherein a conductive surface has a plurality of grounding point screws located away from a cavity to retain electrostatic discharge and electromagnetic interface shielding of a chassis;
   a power receiving unit adjacent to the conductive sheet and disposed around the perimeter of the opening;
   an electromagnetic shield adjacent to the power receiving unit and covering the opening of the conductive sheet; and
   a system base adjacent to the electromagnetic shield;
   wherein the conductive surface and the system base are produced by a co-molding process such that a side of the conductive surface nearest to the slot does not have ground between the system base and system ground.

9. The computing device of claim 7, wherein the power receiving unit is adjustable to change a size of an internal area.

10. The computing device of claim 9, wherein the conductive sheet comprises aluminum.

11. The computing device of claim 9, wherein the length and width of the opening are on an order of millimeters.

12. The computing device of claim 9, wherein the electromagnetic shield includes ferrite.

13. The computing device of claim 9, wherein the system base includes at least one of a keyboard, touchpad, Ethernet port, display port, microphone-in jack, speaker line-out jack, or battery.

14. The computing device of claim 9, wherein the power receiving unit includes a magnetic coil.

15. The computing device of claim 14, wherein the magnetic coil is disposed around the perimeter of the opening in a rectangular shape.

16. The computing device of claim 14, wherein the conductive sheet is adjustable to change a size of an internal area of the opening.

17. A system, comprising:
   a computing unit, comprising:
      a power receiving unit;
      a conductive surface having an opening that is adjacent to the power receiving unit and a cavity extending from the opening towards a perimeter of the conductive surface, the conductive surface having a plurality of grounding point screws located away from the cavity to retain electrostatic discharge and electromagnetic interface shielding of a chassis; and a system base coupled to the power receiving unit wherein the power receiving unit is to provide power to the system base;

wherein the conductive surface and the system base are produced by a co-molding process such that a side of the conductive surface nearest to the cavity does not have ground between the system base and system ground; and a power transmitting unit adjacent to the computing unit.

18. The system of claim 17, wherein the power transmitting unit includes a power charging station.

19. The system of claim 17, wherein the computing unit is at least one of a smartphone device, computing tablet, notebook computer, sub-notebook computer, ultraportable notebook computer, mini-notebook computer, netbook computer, ultrabook computer, or laptop computer.

20. The system of claim 17 further comprising a faraday cage on an exterior of the system base.

\* \* \* \* \*